United States Patent [19]

Stanley

[11] Patent Number: 4,851,122

[45] Date of Patent: Jul. 25, 1989

[54] WATER TREATMENT MEDIA FOR CONDITIONING APPARATUS

[76] Inventor: Bedford F. Stanley, 1650 S. Arizona Ave., #72, Chandler, Ariz. 85248

[21] Appl. No.: 177,154

[22] Filed: Apr. 4, 1988

[51] Int. Cl.⁴ .............................................. B01J 20/26
[52] U.S. Cl. ................................... 210/501; 210/290; 210/502.1; 210/503; 252/179; 502/402
[58] Field of Search ............... 210/663, 668, 686, 290, 210/501, 502.1, 503; 252/179; 502/402

[56] References Cited

U.S. PATENT DOCUMENTS

| | | | |
|---|---|---|---|
| 3,327,859 | 6/1967 | Pall ....................................... | 210/503 |
| 3,382,983 | 5/1968 | Stewart ............................... | 210/503 |
| 3,420,709 | 1/1969 | Barrett et al. ....................... | 210/503 |

Primary Examiner—Ivars Cintins
Attorney, Agent, or Firm—Nelson & Roediger

[57] ABSTRACT

A five component mixed media for a single chamber water conditioner wherein bacteria-reduction, softening and ionic removal of organics and inorganics takes place. The mixed media is found rechargeable with a periodic flushing of the container.

7 Claims, 1 Drawing Sheet

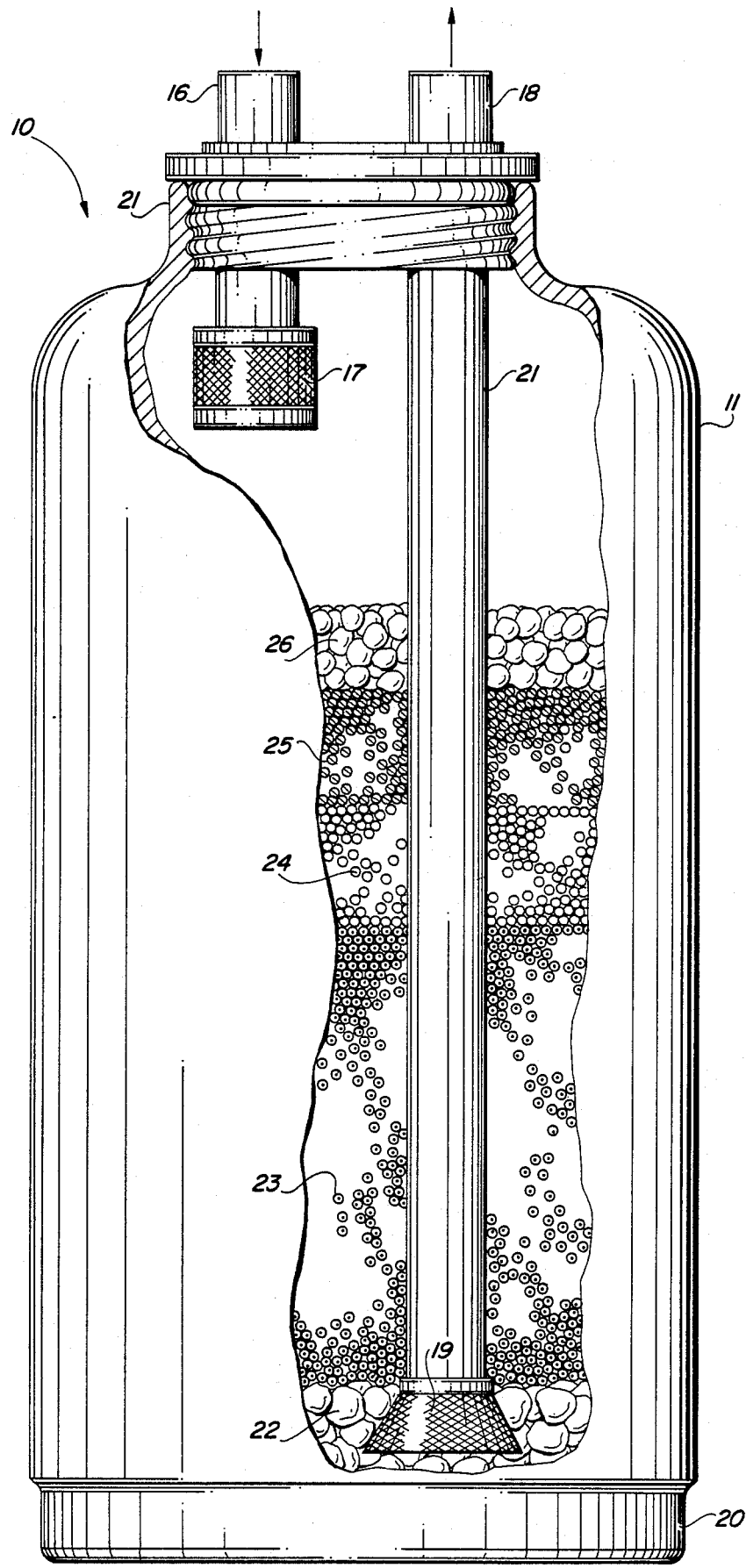

WATER TREATMENT MEDIA FOR CONDITIONING APPARATUS

BACKGROUND OF INVENTION

This invention relates to a mixture for use as a water treatment media in a single chamber water conditioning aparatus.

The increasing public awareness relating to the degradation of domestic water quality has generated increasing interest in the location of water conditioning units located at the point of use rather than at a central treatment facility. At present, municipalities treat drinking water supplies to kill water-borne bacteria with varying degrees of effectiveness. However, most municipalities do not attempt to treat water supplies for toxic chemicals and removal thereof is left up to the user. In addition, substantial amounts of sediment are appearing in domestic water supplies. This sediment is in addition to the mineral ions, notably calcium and magnesium, which are characteristic of hard water. It is recognized that removal of the mineral ions causing hard water is the responsibility of the water user rather than the water supplier.

Several different types of water conditioning devices have been utilized to remove one or more of the different contaminents at the point of use. The conventional types of water softener which utilize a rechargeable cation resin to effect an ion exchange between calcium and magnesium ions and sodium ions to produce a soluble sodium salt before the water enters the facility is commonplace. The water softener utilizes a single resin which is capable of being recharged by reversing the ion exchange process and flushing the system while diverting the output of the water softener to a discharge drain. A similar unit is often used to effect dealkalizing operations utilizing a separate chamber containing an anion resin which will remove bicarbonate ions.

An ion exchange process which removes those polarized ionic contaminants is often supplemented with an additional container containing an activated carbon, typically silver-activated charcoal, which adsorbs certain material. Among these adsorbed materials are non-polar organics including various hydrocarbons. The activation of the carbon, typically with silver, has been shown to remove harmful bacteria. Thus, the user desiring to effect broad spectrum water treatment at his facility is faced today with connecting a plurality of treatment devices in series between the municipal water supply and the water output taps. The homeowner with a relatively low volume water usage has used a double chamber series-connected portable water conditioner wherein a cation and anion resin are located in a single container. A serially-connected activated charcoal container, frequently expressly made to be disposable is also provided. Among these relatively low volume portable water conditioners are the apparatus described in U.S. Pat. Nos. 4,287,057 and 4,541,926.

The typical home water conditioner is characterized by a container having a number of compartments therein, each containing a different purifying media separated by screens which may be themselves silver activated to reduce or eliminate harmful bacteria. The home water conditioner of U.S. Pat. No. 4,541,926 shows two identical containers, differing only in size, one of which contains a mixture of a cation and anion resin. The device has been found to produce the desired results for low-volume home water usage.

The present invention has as its primary objective the provision of a combined water treatment media that can be incorporated in a single container without the need for compartmentalizing the container by the use of internal support screens and the like. By providing a single media charge for incorporation in a container, the serial connection of a plurality of containers with the necessity for fluid interconnections therebetween is eliminated. Furthermore, the present invention provides a water treatment media adapted for use in a single container which is effective in removing sediment, bacteria, organic materials as well as the inorganic metal ions or hardness presently removed by water softeners.

SUMMARY OF INVENTION

This invention relates to a media mixture for placement in a single chamber water conditioning apparatus which comprises at least three resin components. The resins are pre-mixed in the stated proportions and added to the interior of the container in a single operation.

The mixture includes a macro-porous anion exchange resin with the resin being pelletized and having a large internal surface area for the retention of organic anion molecules present in the fluid passing through the container. Also, a micro-porous anion exchange resin pelletized and having an internal surface area less than that of the microporous anion resin for the retention of inorganic anion molecules is added in approximately the same quantity. To this mixture of micro-porous and macro-porous anion exchange resins is added a cation exchange resin which serves to retain metalic ions and reduces the amount of dissolved solids in the fluid passing through the container. The amount of cation exchange resin is approximately twice that by volume of the combination of macro-porous anion resin and micro-porous anion resin.

The mixture is preferably provided with a filtration agent having a specific gravity that exceeds that of the aforementioned resins. This filtration agent serves to remove sediment contained in turbid input water. Also, a bacterial-reducing agent, preferably activated charcoal, is also added to the mixture. The specific gravity of the bacterial reducing agent is chosen to be different than that of the resins.

The mixture of water treatment media is added to a container that does not include or incorporate any internal screening or flow impediments so that in normal operation, a degree of movement is imparted to the mixture as the fluid passes therethrough. The direction of fluid movement through the media mixture is determined by the construction of the input-output means of the particular conditioner employed. In operation, the filtration agent provides a bed proximate the bottom of the container and the passage of the fluid through this region causes the sediment to be removed as the fluid moves therethrough. The fluid also encounters the mixed resins and the three resins remove the corresponding impurities from the water. The fluid also passes through the bacterial reducing agent during the conditioning process prior to exiting from the container. As the operation of the conditioner continues past its initial stage, the bacterial-reducing agent separates from the water-treatment media, normally by forming a layer upon the mixed resin media. Since the media themselves have different specific gravities, a stratification of the resin media occurs during continued operation.

By providing a mixed component water treatment media, the apparatus necessary to provide water purification is less expensive to manufacture, install and maintain. Furthermore, the absence of screening and barriers within the container enhance the internal flow characteristics of the container so that the capacity of system is not reduced thereby. While the mixed water treatment media is suitable for use in small installations, the benefits are most noticeable in larger industrial and commercial applications.

Further features and advantages of the invention will become more readily apparent from the following detailed description of a preferred embodiment thereof when taken in conjunction with the accompanying drawing.

BRIEF DESCRIPTION OF THE DRAWING

The FIGURE is a side view and partial section of a container containing the water treatment media which is the subject of the present invention.

DESCRIPTION OF THE PREFERRED EMBODIMENT

Referring now to the single FIGURE, water conditioning unit 10 is shown containing the mixed water treatment media within cylindrical shell 11 after having been utilized for a period following the initial loading of the mixture. The shell is a non-permeable plastic cylinder having an epoxy-fiberglass filament wound thereabout for reinforcement. A support base 20 is made integral with the shell 11 and may be formed of molded rubber to accomodate different support surfaces or can be an injection molded plastic base member secured to the shell. The seamless, one-piece molded inner surface of shell 11 provides a smooth fiber-free inner surface which is chemically resistant to impurities contained in the water passing therethrough.

A top threaded opening 21 is shown provided in shell 11 along with a correspondingly threaded adapter 15 for insertion therein. The adapter 15 includes an input port 16 which extends inwardly of the container and terminates in an inlet screen diffuser 17. The diffuser serves to distribute the flow of the input fluid laterally rather than directing it downwardly into the media and channeling same. Also, the adapter 15 contains an output port coupled by vertical conduit section 21 to a screened diffuser 19 located proximate to the bottom of the shell 11. Thus, fluid entering the assembly is directed outwardly of the diffuser 17 and is distributed on the top or exposed surface of the water treatment media and travels downwardly under pressure to the screened diffuser 19. While the top located input port is shown in this embodiment, it is to be noted that the flow path can be reversed if desired without changing the purification process of the invention.

As shown in the FIGURE, the media comprises a sequence of five layers which corresponds to the position of the different components of the media after prolonged operation. Initially, the media is added as a mixture of the five components in proportions which will later be discussed. The different components have varied specific gravities so that sorting occurs during the turbulence introduced by the passing of fluid therethrough. However, the different components provide purification and cleansing action even when existing in the mixed state during initial operation. Thus, the loading of the container and the storage of the media is greatly simplified for the user of a single container conditioning apparatus.

The lower-most bed 22 shown in the FIGURE contains a filtration agent, for example crushed quartz having a typical particle size of one-quarter inch, which gathers and retards the passage of sediment into the screened diffuser 19 located at the end of vertical conduit 21. Above the filtration agent is a thick bed 23 comprised of cation exchange resin beads. This bed 23 contains a conventional polystyrene sulfonate resin in bead-form which serves to reduce the hardness level of the water passing therethrough. The cation exchange resin is used with the well known sodium cycle wherein the sodium ions of the resin are exchanged for calcium and magnesium ions in the water to provide a sodium-based soft water. A variety of cation exchange resins with different cross linkages, ionic form, particle sized distributions and degrees of purity are available. In the preferred embodiment, the cation exchange resin found well-suited for use is the IONACC-249 resin sold by SYBRON CHEMICALS INC. of Birmingham, N.J. The resin beads have a $-16$ and $+40$ mesh particle size with a weight per unit volume of 52 lbs per cubic ft.

Two types of anion exchange resins are noted to be located above the cation exchange resin. Layer 24 comprises micro porous anion exchange resin beads which function to remove negative ions including silica, carbon dioxide, bicarbonate, sulfate and chloride ions. The micro porous resin is a styrenedivinyl benzene copolymer matrix with a particle size typically in the $-16$ and $+50$ mesh range. The weight per unit volume of this exchange resin is 44 lbs per cubic ft. and thus is lighter than the cation exchange resin of bed 23 so that it moves to an overlying position as bed 24 as shown in the FIGURE. The microporous nature of the resin refers to the available internal surface area of the resin matrix and typically resins of this type lack sufficient pore size to absorb the larger organic molecules now being found in ever-increasing levels in domestic water supplies. One anion exchange resin found well-suited for use in the present mixtures is the IONAC ASB-2 exchange resin sold by Sybron Chemicals Inc. of Birmingham, N.J.

Overlying bed 24 in the FIGURE is a bed 25 of macroporous anion exchange resin beads. The porosity of the resin is larger than that of the resin of bed 23 to permit the absorption and adsorption of large organic anions characteristic of water from underground acquifers that have received herbicides, pesticides and man-made industrial waste products. The macroporous resin is formed of styrene divinylbenzene in a chloride form with a screen size in the range of $-16$ to $+40$ mesh. The polymer matrix and ionic form of the resin is preferably the same as that of the resin of bed 24. The increase in pore volume results in a lower weight per unit volume than that of bed 24 so that the sorting process during use results in the macroporous resin overlying the microporous resin. In the embodiment shown, the layering effect was obtained with a macroporous resin, IONAC A-642 of Sybron Chemicals, Inc., having a 41 lb per cubic ft. weight per unit volume.

The relative proportions of the three resins has been found through testing and calculation to achieve the desired results with the microporous and macroporous anion resins of approximately equal thickness beds in the container. The cation resin is twice the combined thickness or 67% (two thirds) of the total resin volume in order to approximate the purifying lifetime of the anion resins. Thus, each anion resin bed is one-sixth of the total resin volume. Since one of the objectives of the present invention is to provide a lifetime between resin recharges that ends at a time when the three resins are each approaching the need for the passage of a brine or other recharge solution therethrough, the amount of cation required has been found to be approximately twice the volume of the anion resins.

An activated charcoal bed 26 is shown at the top of the mixed media charge since the charcoal is normally the lightest component of the mixture. This is the case when using low cost carbonized coconut shells. However, heavier carbons may well form a lower layer in the strata. The carbon has been found to regenerate through the back flush with brine, either sodium or potassium. Typically the weight per unit volume of charcoal formed of carbonized coconut shells is 22 lbs per cubic foot so that it readily separates to form the top layer. The carbon, utilized for the removal of bacteria and for flavor enhancement of the water, may be omitted in applications where the bacteria count is low and flavor is not a concern. In the preferred embodiment, the volumes of the quartz and the silver-activated charcoal are approximately the same. The performance of one embodiment of the invention in the stratified configuration shown in the FIGURE was found to provide the following results:

| Impurity Concentration | Input Concentration | First Day Output Concentration | Third Day Output Concentration (after recharge) |
|---|---|---|---|
| Nitrates | 10 ppm | Not observed | Not observed |
| Iron | 3 ppm | Not observed | Not observed |
| Bacteria | 1 colony | Not observed | Not observed |
| Hardness (Ca,Mg) | 30 grains | Not observed | Not observed |

The observed results were obtained from a water conditioner utilizing the mixed media which is the subject of the present invention after recharge determined by a volumetric flow meter. The frequency of recharge will of course vary with the character of the water supply.

While the above description has referred to a specific embodiment of the invention, it is to be noted that many variations and modifications may be made therein without departing from the scope of the invention as claimed.

I claim:

1. A mixture for placement into a water conditioning apparatus of the type including a container for confining the mixture, inlet means for introducing water to be treated into the container and outlet means spaced from the inlet means for discharging the treated water, said mixture including three resins and comprising:
   (i) a macroporous anion exchange resin comprising approximately one-sixth by volume of the three resins, said macroporous resin having a large internal surface area for the retention of organic anion molecules present in fluid passing therethrough;
   (ii) a microporous anion exchange resin comprising approximately one-sixth by volume of the three resins, said microporous resin having an internal surface area less than that of said macroporous anion resin and retaining inorganic anion molecules present in fluid passing therethrough; and
   (iii) a cation exchange resin comprising approximately two-thirds by volume of the three resins, said cation resin retaining metallic ions and reducing the amount of dissolved solids in fluid passing therethrough, said mixture absorbing and adsorbing both dissolved organic and inorganic impurities as well as retaining metallic ions in fluid exposed to said mixture.

2. The mixture of claim 1 wherein said resins have different specific gravities to thereby promote separation during continued use.

3. The mixture of claim 2 wherein said cation exchange resin has a specific gravity greater than that of said anion exchange resins.

4. The mixture of claim 3 wherein said cation exchange resin has a specific gravity approximately 20 percent greater than that of said anion exchange resins.

5. The mixture of claim 4 further comprising a bacterial-reducing agent contained therein.

6. The mixture of claim 5 wherein said bacterial-reducing agent has specific gravity less than that of said anion exchange resins.

7. The mixture of claim 6 further comprising a filtration agent having a specific gravity greater than that of said cation exchange resin.

* * * * *